United States Patent

Higurashi et al.

[11] Patent Number: 6,122,432
[45] Date of Patent: Sep. 19, 2000

[54] INFORMATION SIGNAL RECORDING APPARATUS

[75] Inventors: Seiji Higurashi; Yoichi Zenno, both of Tokyo, Japan

[73] Assignee: Victor Company of Japan, Ltd., Yokohama, Japan

[21] Appl. No.: 09/025,750

[22] Filed: Feb. 18, 1998

[30] Foreign Application Priority Data

Feb. 21, 1997 [JP] Japan ................................. 9-053869

[51] Int. Cl.⁷ ..................................................... H04N 5/91
[52] U.S. Cl. ............................... 386/67; 386/46; 360/64
[58] Field of Search .................................. 386/1, 40, 46, 386/67, 124, 95, 110; 360/57, 60–61, 64, 66

[56] References Cited

U.S. PATENT DOCUMENTS

| | | | |
|---|---|---|---|
| 5,539,528 | 7/1996 | Tawa | 386/110 |
| 5,878,187 | 3/1999 | Kubota et al. | 386/95 |

*Primary Examiner*—Wendy Garber
*Assistant Examiner*—Christopher Onuaku
*Attorney, Agent, or Firm*—Anderson, Kill & Olick P.C.

[57] ABSTRACT

The present invention provides an information recording apparatus having a rotary drum, plural rotary heads provided on the rotary drum. Each of the plural rotary heads has a rotary transformer to record a recording signal which is obtained by processing a digital information signal to be recorded with a predetermined treatment, on a magnetic tape to form a predetermined track pattern by supplying the recording signal to the plural rotary heads through the rotary transformers. The apparatus further has a signal generating device for generating a signal having an intermediate voltage of an amplitude of the recording signal to be supplied to the rotary heads. When an intermittent recording is performed with the plural rotary heads by running the magnetic tape more slowly than a normal recording to form such a normal track pattern as formed in the normal recording, the signal having the intermediate value of the amplitude of the recording signal to be supplied is applied to the plural rotary heads which perform an overlapping run on tracks already recorded by the signal generating device.

5 Claims, 6 Drawing Sheets

INFORMATION SIGNAL RECORDING APPARATUS

BACKGROUND OF THE INVENTION

1. Field of the Invention

The present invention relates to an information signal recording apparatus for recording a digital information signal, and particularly, relates to an information signal recording apparatus capable of performing an intermittent recording by running a magnetic tape at a lower running speed than at a normal recording.

2. Description of the Related Art

Presently, there is the so-called "helical scanning type digital VTR", wherein a magnetic tape is wound around a rotary drum, and video and sound digital signals are recorded on the magnetic tape by rotating magnetic heads (referred to as rotary heads hereinafter) mounted on the rotary drum, resulting in a predetermined track pattern.

FIG. 1 is a plan view of a rotary drum for explaining attachment positions of rotary heads provided thereon in a helical scan type recording apparatus;

FIG. 2 is an explanatory view of a track pattern formed on the magnetic tape in a normal recording mode by employing the helical scan type recording apparatus shown in FIG. 1;

FIG. 3 is an explanatory view of an intermittent recording by employing the helical scan type recording apparatus;

FIG. 4 is a circuit diagram employing rotary transformers in the helical scan type recording apparatus;

FIG. 5 is a chart of pulses generated responsive to revolution of the rotary heads which pulses are used in the intermittent recording, and FIGS. 6(A) and 6(B) are charts for explaining a discharge signal generated in the intermittent recording;

In a normal recording mode (referred to as normal recording) of the helical scanning type digital VTR, the magnetic tape is transferred at a constant speed along the rotary drum while the rotary drum is rotated at a constant speed.

As shown in FIG. 1, in the normal recording, rotary heads a1, b1 having different azimuth angles to each other are mounted on the rotary drum 10 to face each other at 180°. As shown in FIG. 2 tracks A, B are alternately formed on the magnetic tape T responsive to the rotation of the rotary heads a1, b1.

Here, for instance, in contrast to a case that a digital information signal transferred at a certain data rate is recorded in the normal recording mode, when a digital information data transferred at a lower data rate than that in the normal recording mode is recorded, to employ the so-called "intermittent recording" (the time-lapse recording) is effective to increase the capacity of recording.

For instance, when the intermittent recording is performed in such a manner that the tape speed is made to be ⅓ as low as that in the normal recording and one track is formed at every 1.5 revolutions (the number of revolution of the rotary drum 10 is the same speed as that of the normal recording mode), it is possible to form almost the same track pattern as that shown in FIG. 2 by alternately applying a recording signal to each of the rotary heads a1, b1 at one time per 1.5 revolutions of the rotary drum 10.

At the time, the recording time for a given magnetic tape will be 3 times as much as that in the normal recording mode because the tape speed thereof is ⅓ as low as that in the normal one.

When the tape speed is made to be ⅓ as low as that in the normal recording without the change of the number of revolutions of the rotary drum 10, actually, the rotary heads a1, b1 scan on the magnetic tape T, forming tracks of which parts are superimposed to each other as shown in FIG. 3. Specifically, the rotary heads a1, b1 form tracks A1, B1 during one revolution of the rotary drum 10, and tracks A2, B2 during next one revolution and successively tracks A3, B3, A4, B4, A5, B5, A6, B6, . . . (up to B3 are shown).

Accordingly, in order to perform the so-called "intermittent recording", it is possible to obtain such a track pattern as similar to that formed in the normal recording without an interference of the recorded tracks caused by the superimposition of the recording signal by supplying the recording signal to both the rotary heads a1, b1 in such a timing that the rotary heads a1, b1 scan on the tracks A1, B2, A4, B5 . . . which are less superimposed to each other shown in FIG. 3.

In order to perform the intermittent recording by using the rotary heads a1, b1 having a circuit including rotary transformers Ra, Rb as shown in FIG. 4, it is possible to perform the intermittent recording by supplying the recording signal to the rotary heads a1, b1 in such a timing as shown in FIG. 5 in accordance with the revolution of the rotary drum 10.

As shown in FIG. 5, a pulse (DFF: drum flip-flop) of [H] (high) and [L] (low) levels is generated by control pulse generating means (not shown) responsive to the revolution of the rotary heads a1, b1.

For instance, when the pulse (DFF) is [L] level, the rotary head a1 scans on the magnetic tape T, and when the pulse (DFF) is [H] level, the rotary head b1 scans on the magnetic tape T. In addition, when the rotary heads a1, b1 scan on the hatched tracks A1, B2, A4, B5 . . . , the recording signal is applied to both the rotary heads a1, b1, resulting in the track pattern almost the same as that shown in FIG. 2.

However, upon performing the intermittent recording with respect to the tracks A1, B2, A4, B5 . . . , the recording signal is intermittently applied to both the rotary heads a1, b1. Thus, when the rotary heads a1, b1 scan on the tracks B1, A3, B4, A6 . . . (inoperative intervals) thereafter, there is a problem that a discharge signal (current) Sd caused by a differential response of the recording signal occurs in each of the rotary heads a1, b2.

As shown in FIG. 6(B), for instance, when the rotary head a1 is forming the track A1 by scanning on the magnetic tape T, the recording signal is applied to the rotary head b1 as well as the rotary heads a1. Thus, when the rotary head b1 successively scans on the track B1, the discharge signal Sd flows in the rotary head b1 due to the differential response of the recording signal mentioned above.

Specifically, when the recording signal is made of a voltage signal responsive to a binary code of [1] or [0] of a digital information signal, the voltage signal responsive to the code of [1] or [0] is always applied to the rotary heads a1, b1.

When the recording signal to the rotary heads a1, b1, is stopped the state just prior to the stop of the recording signal for recording the track A1 as shown in FIG. 6(B) is maintained for a while in the rotary heads a1, b1. Here, it is difficult for the rotary heads a1, b1 each having the rotary transformer Ra or Rb to transmit the signal of low frequency. Thus, the decaying discharge signal Sd caused by the recording signal just prior to the stop of the recording signal flows through the rotary head b1 while the rotary head b1 scans on the beginning of the track B1.

In other words, upon scanning on the tracks B1, A3, B4, A6 . . . , when the discharge signal Sd is generated in the rotary heads a1, b1, the discharge signal interferes with the tracks A1, B2, A4, B5 . . . where the recording signal is recorded, resulting in a degradation in the S/N of the reproduction signals obtained from the tracks A1, B2, A4, B5 . . .

In order to prevent the discharge signal Sd from generating, it is conceivable to provide a switch to each of the rotary heads a1, b1 for supplying the recording signal. Thereby, the recording signal to the rotary heads a1, b1 is turned on or off responsive to the intermittent operation of the recording signal. However, there arises a problem that such method requires a rather complicated control to switch the recording signal to the plural rotary heads responsive to the revolution of the rotary drum 10.

Further, the more the number of the rotary heads is increased, the more the number of the switches is required, resulting in a complicated circuit and control.

SUMMARY OF THE INVENTION

Accordingly, a general object of the present invention is to provide an information signal recording apparatus, in which the above disadvantages have been eliminated.

A specific object of the present invention is to provide an information signal recording apparatus for recording a recording signal on a magnetic tape, the apparatus comprising a rotary drum, plural rotary heads provided on the rotary drum, each of the plural rotary heads having a rotary transformer for recording the recording signal which is produced by processing a digital information signal to be recorded with a predetermined treatment, on the magnetic tape to form a predetermined track pattern by supplying the recording signal to the plural rotary heads through the rotary transformers, the apparatus further comprising: signal generating means for generating a signal having an intermediate voltage of an amplitude of the recording signal to be supplied to the rotary heads, wherein when an intermittent recording is performed with the plural rotary heads by running the magnetic tape more slowly than a normal recording to form such a normal track pattern as formed in the normal recording, and during inoperative intervals the signal having the intermediate voltage of the amplitude of the recording signal is applied to the plural rotary heads to prevent the track pattern already recorded from being rewritten by the rotary heads.

Another and more specific object of the present invention is to provide an information signal recording apparatus for recording a recording signal on a magnetic tape, the apparatus comprising a rotary drum, plural rotary heads provided on the rotary drum, each of the plural rotary heads having a rotary transformer for recording the recording signal which is produced by processing a digital information signal to be recorded with a predetermined treatment, on the magnetic tape to form a predetermined track pattern by supplying the recording signal to the plural rotary heads through the rotary transformers, the apparatus further comprising: a push-pull type recording amplifier having transistors for supplying the recording signal to the plural rotary heads by switching operation of transistors; and control means for controlling currents flowing through the transistors, wherein when an intermittent recording is performed with the plurality of the rotary heads by running the magnetic tape more slowly than a normal recording to form such a normal track pattern as formed in the normal recording, and during inoperative intervals the plural rotary heads are not supplied with the recording signal by the control means.

Other objects and further features of the present invention will be apparent from the following detailed description.

DETAILED DESCRIPTION OF THE PREFERRED EMBODIMENT

Figure 1:
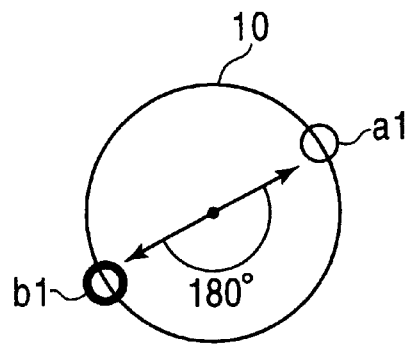
FIG. 1 is a plan view of a rotary drum for explaining attachment positions of rotary heads provided thereon in a helical scan type recording apparatus.
Figure 2:
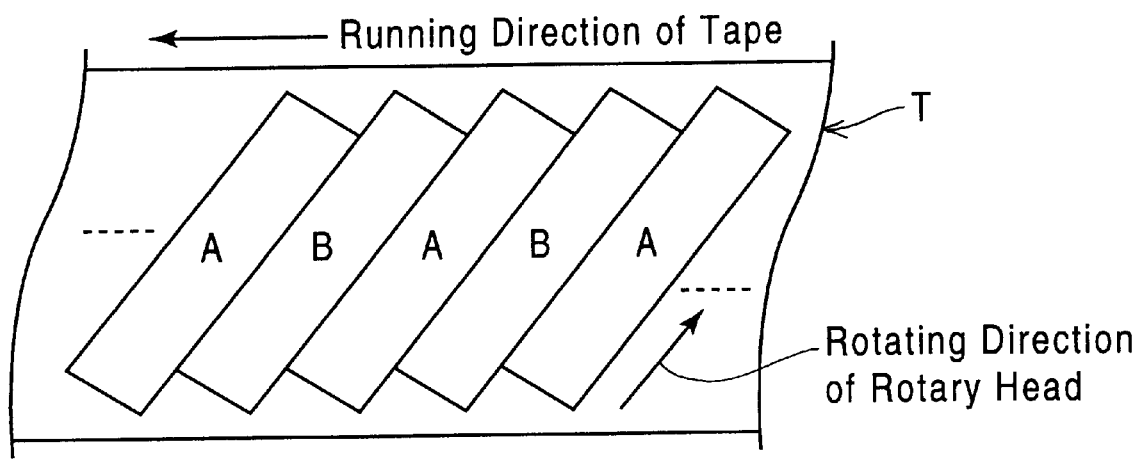
FIG. 2 is an explanatory view of a track pattern formed on the magnetic tape in a normal recording mode by employing the helical scan type recording apparatus shown in FIG. 1.
Figure 3:
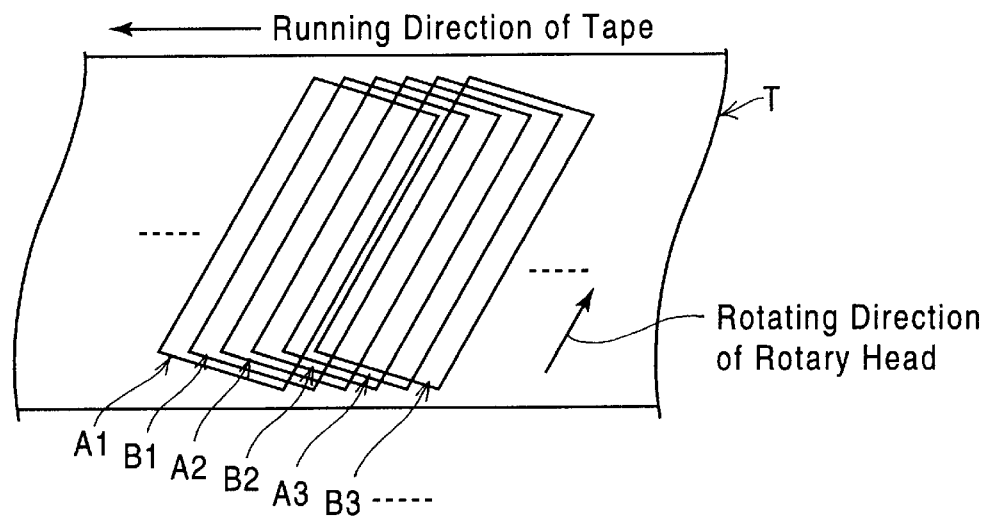
FIG. 3 is an explanatory view of an intermittent recording by employing the helical scan type recording apparatus.

Next, the description is given of a first embodiment of the present invention referred to drawings, wherein like parts are shown by corresponding reference characters throughout the drawings.

Figure 7:
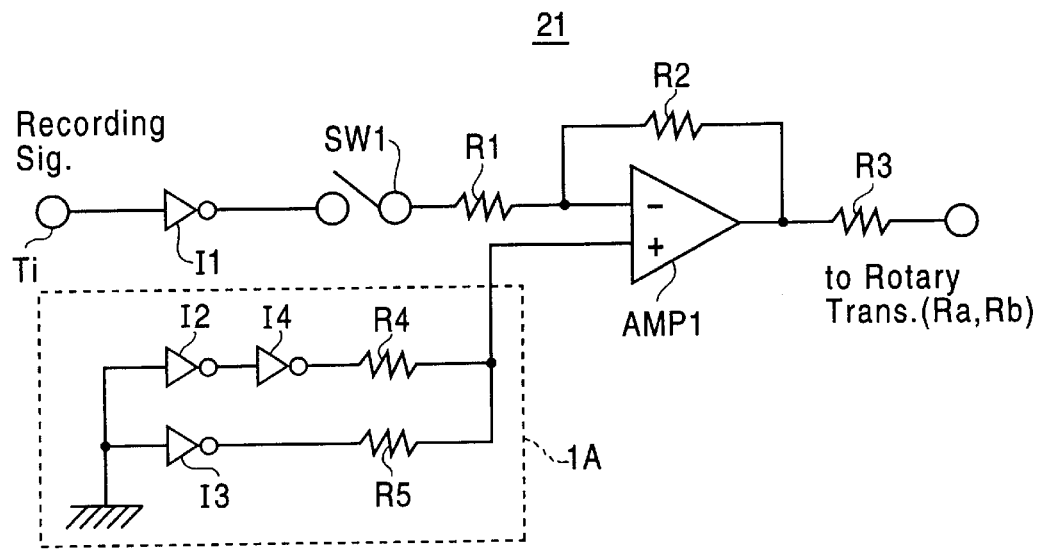
FIG. 7 is a block diagram for explaining an embodiment of signal generating means as a main part of the present invention.
Figure 8:
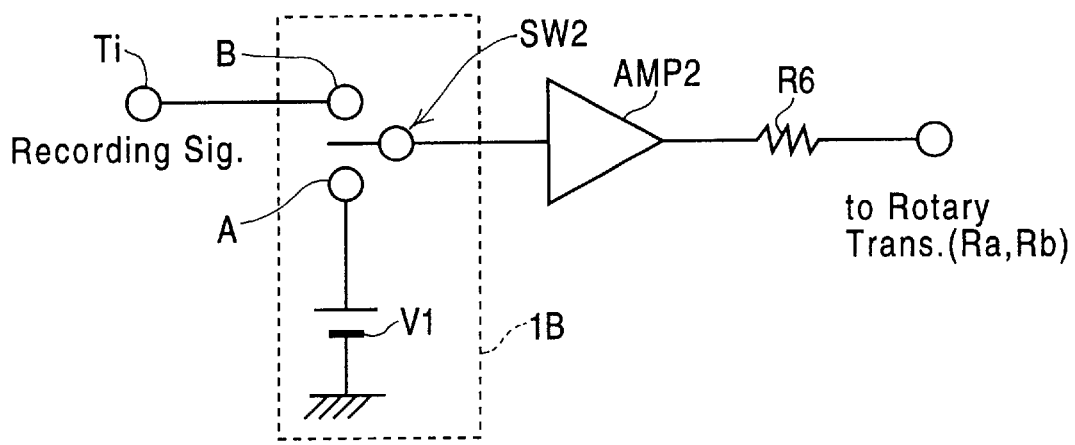
FIG. 8 is a block diagram for explaining another embodiment of the signal generating means as a main part of the present invention.
Figure 9:
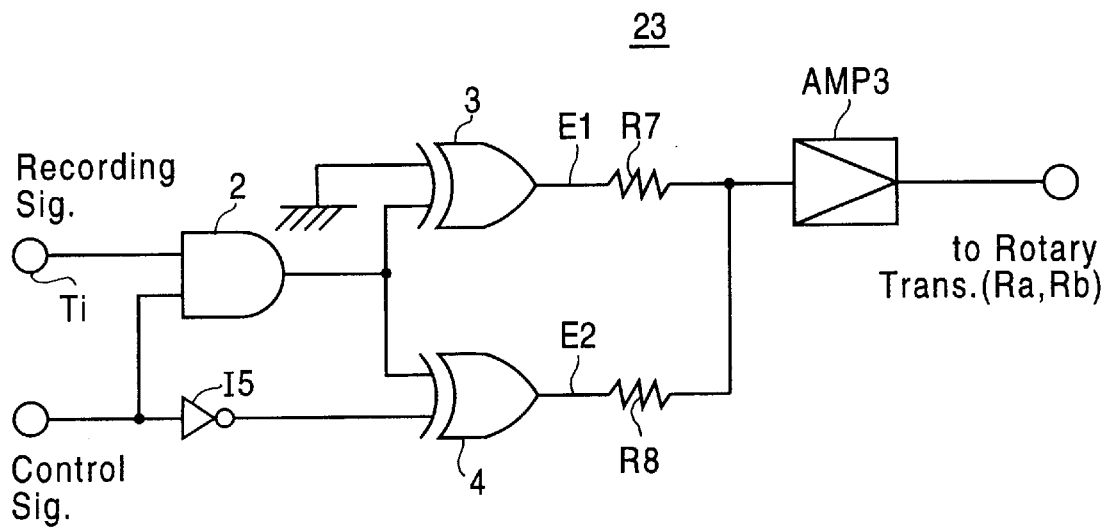
FIG. 9 is a block diagram for explaining a further embodiment of the signal generating means as a main part of the present invention.
Figure 10:
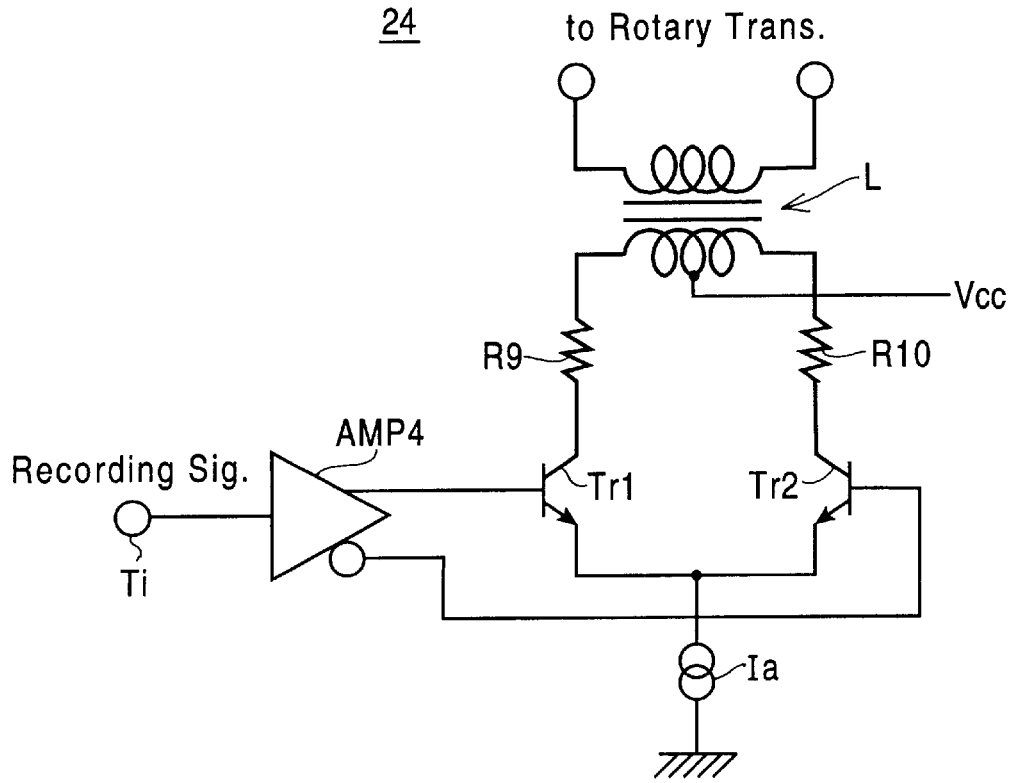
FIG. 10 is a circuit for explaining a push-pull type recording amplifier used in the present invention.
Figure 11:
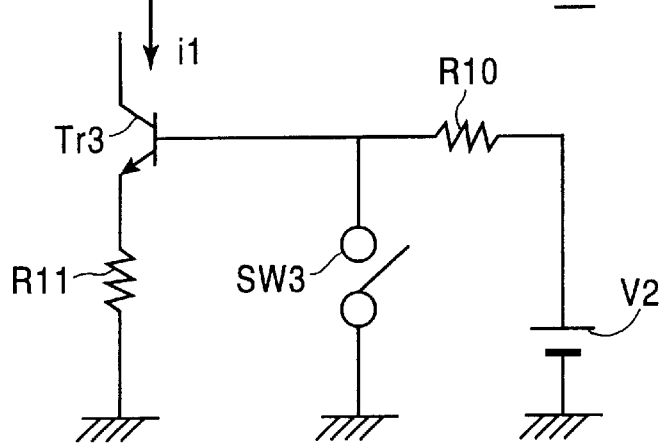
FIG. 11 is a circuit for explaining switching means (switching circuit) of the push-pull recording amplifier shown in FIG. 10.

FIG. 7 is a block diagram for explaining an embodiment of signal generating means as a main part of the present invention;

FIG. 8 is a block diagram for explaining another embodiment of the signal generating means as a main part of the present invention;

FIG. 9 is a block diagram for explaining a further embodiment of the signal generating means as a main part of the present invention;

FIG. 10 is a circuit for explaining a push-pull type recording amplifier used in the present invention; and FIG. 11 is a circuit for explaining switching means (switching circuit) of the push-pull recording amplifier shown in FIG. 10.

Figure 6A:
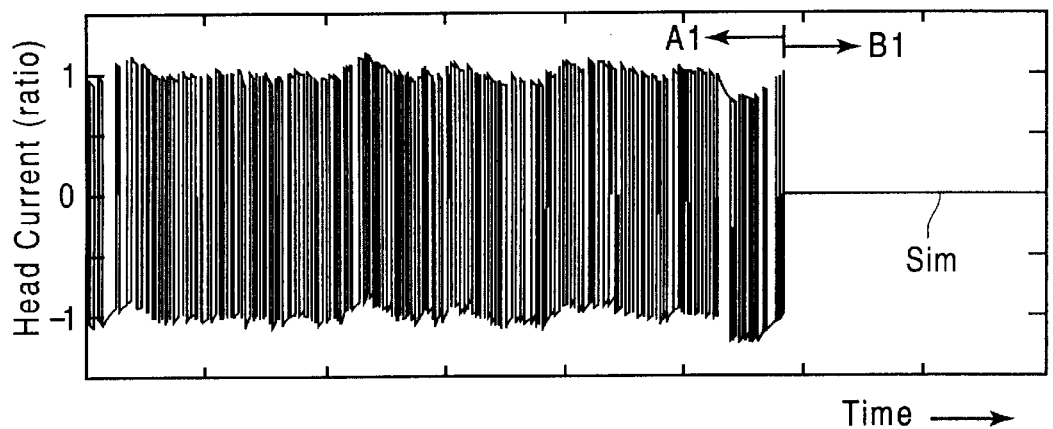
FIGS. 6(A) and 6(B) are charts for explaining a discharge signal generated in the intermittent recording.

Upon performing the intermittent recording, when the rotary heads a1, b1 scan on the tracks A1, B1, it is desirable that the recording signal to be applied to the rotary heads a1, b1 is switched as shown in FIG. 6(A), wherein after the rotary head a1 has completed the writing (recording) of the track A1, the recording signal is switched to a signal having an intermediate voltage of an amplitude of the recording signal, so that a current Sim flowing through the rotary heads a1, b1 is made to be zero.

Figure 6B:
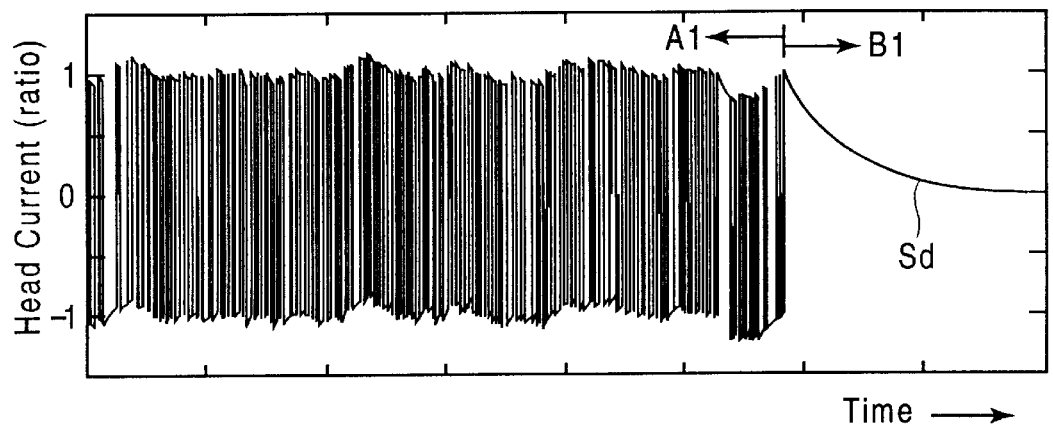

In the present invention, after the rotary head a1 has completed the writing of the track A1, the signal having the intermediate voltage of the amplitude of the recording signal is applied to the rotary heads a1, b1 so that the discharge signal Sd shown in FIG. 6(B) as is prevented from being overwritten to the track A1 by the rotary head b1.

The main feature of the information signal recording apparatus 21 of the present invention is that the apparatus has signal generating means for generating the intermediate voltage of the amplitude of the recording signal so as to allow the current flowing through the rotary heads a1, b1 to be zero.

As shown in FIG. 7, an information signal recording apparatus 21 comprises inverter buffers I1 to I4 for inversely outputting the recording signal as well as outputting the voltage signal corresponding to the amplitude of the recording signal, a switch SW1 for switching the recording signal on or off, a differential amplifier AMP1 for operating responsive to the outputs from the switch SW1 and the inverter buffers I1 to I4.

The inverter buffers I1 to I4 are, for instance, made of one chip IC. Here, the inverter buffers I2 to I4 and resistors R4, R5 form the signal generating means 1A for generating the intermediate voltage of the amplitude of the recording signal.

When a resistance value of the resistor R4 is equal to that of the resistance R5, an output signal through the inverter buffers I2, I4 has an inverted relation to an output signal through the inverter buffer I3 with respect to a voltage outputted in accordance with [1] or [0] of the recording signal. Thus, the combined output signal to be inputted to the differential amplifier AMP1 becomes the above-mentioned intermediate voltage.

Figure 4:
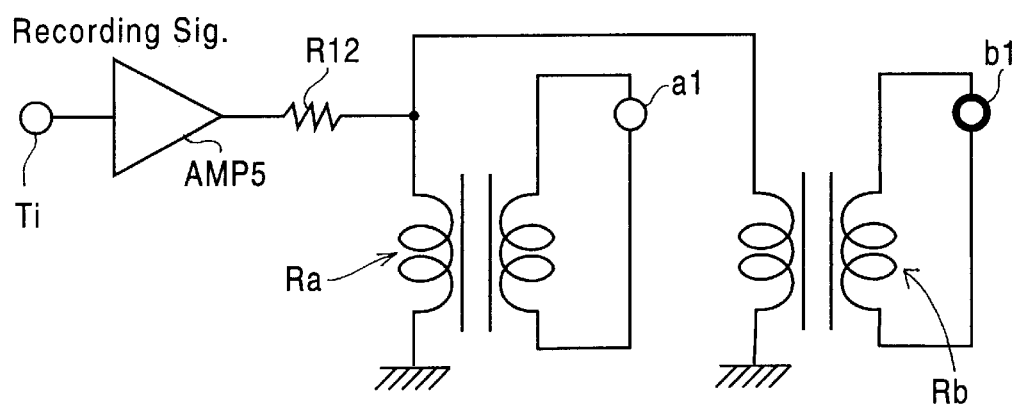
FIG. 4 is a circuit diagram employing rotary transformers in the helical scan type recording apparatus.

As shown in FIG. 7, upon recording, the recording signal incoming through an input terminal Ti is applied to the differential amplifier AMP1 by turning on the switch SW1 which is connected between the inverter buffer I1 and one terminal (−) of the differential amplifier AMP1. As the above-mentioned intermediate voltage is applied to another terminal (+) of the differential amplifier AMP1, the output from the differential amplifier AMP1 is applied to the rotary transformers Ra, Rb shown in FIG. 4 through the resistor R3 responsive to the amplitude of the recording signal.

Upon inhibiting the recording of the recording signal, the switch SW1 is turned off. Thus, the intermediate voltage applied to the input terminal (+) of the differential amplifier AMP1 is applied to the rotary transformers Ra, Rb, resulting in that the current flowing through the magnetic heads a1, b1 becomes zero.

Accordingly, the current of the recording signal flowing through the rotary heads a1, b1 becomes such a signal as shown in FIG. 6(A), resulting in preventing the discharge signal Sd from being recorded on the previously recorded track.

According to the signal generating means of the present invention, it is possible to employ any signal generating means as far as it generates the above-mentioned intermediate voltage in the foregoing.

For instance, as shown in FIG. 8, in this information signal recording apparatus 22, the signal generating means 1B comprises a constant-voltage power supply v1 and a switch SW2 for switching the recording signal to the above-mentioned intermediate voltage from the constant-voltage power supply V1 and vice versa.

Specifically, the switch SW2 is switched to an input terminal B thereof to allow the recording signal to be inputted to an amplifier AMP2 when the recording signal is written, and is switched to an input terminal A thereof to allow the constant voltage corresponding to the intermediate voltage to be applied to the amplifier AMP2 when the recording signal is inhibited to be written.

Here, the voltage of the constant-voltage power supply V1 is established to be the intermediate voltage responsive to the amplitude of the recording signal preliminarily measured, and is applied to the rotary heads a1, b1 through the rotary transformers Ra, Rb when the recording signal is inhibited to be written.

Upon writing the recording signal, the recording signal is applied to the amplifier AMP2 to be amplified to a predetermined level and is applied to the rotary heads a1, b1 through a resister R6 and the rotary transformers Ra, Rb.

Figure 5:
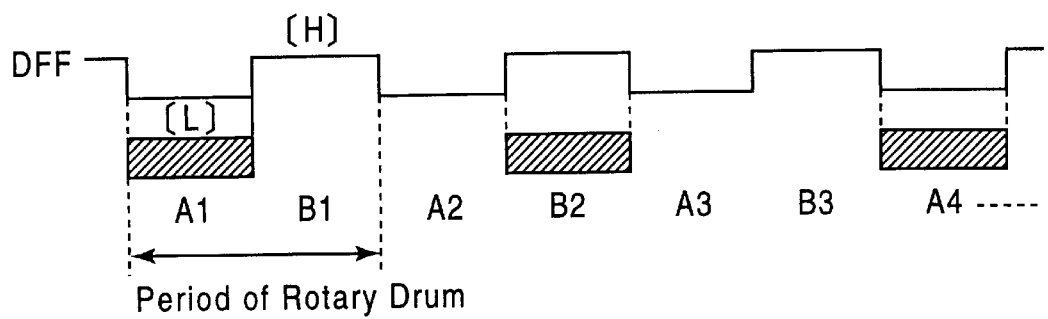
FIG. 5 is a chart of pulses generated responsive to revolution of the rotary heads which pluses are used in the intermittent recording.

Here, to the switch SW1 or SW2 mentioned in the foregoing, there is applied a control pulse signal generated in a timing shown in FIG. 5 by a control pulse generating device (not shown) to allow the control of the selective switching with respect to the switches SW1, SW2.

The above-mentioned information signal recording apparatuses 21 and 22 mentioned above are respectively equipped with the switch SW1 or SW2, however, it is possible to eliminate the switch SW1 or SW2 by constructing the signal generating means with a gate circuit as shown in FIG. 9, resulting in a simple construction.

Specifically, in this information recording apparatus 23, the signal generating means comprises an AND gate 2 for doing arithmetic with respect to the recording signal and the control pulse signal which is made to be [H] level upon writing and is made to be [L] level upon inhibition of writing, an Ex-OR gate 3 for doing arithmetic with respect to the output from the AND gate 2 and an inverse output of the control pulse signal, another Ex-OR gate 4 for doing arithmetic with respect to the output from the AND gate 2 and the inverse output of the control pulse signal, and an amplifier AMP3 for amplifying the outputs from the Ex-OR gate 3 through a resistor R7 and the outputs from the Ex-OR gate 4 through a resister R8 to a predetermined output level so as to apply to the rotary transformers Ra, Rb. Here, the above-mentioned control pulse signal is the same as that used in switching the switches SW1 and SW2.

Exemplarily, when the recording signal (for example, 0010110, a binary digit information) is written on the magnetic tape T, (i.e., when the control pulse signal is [H]) level, the outputs E1, E2 from the Ex-OR gates 3, 4 become 0010110 caused by the gate circuits 2, 3, 4 and the inverter I5, respectively, and are applied to an amplifier AMP3. Thus, they are applied to the rotary transformers Ra, Rb.

On the other hand, when the recording signal is inhibited to be written because the rotary heads a1, b1 trace the recorded tracks overlapping, the control pulse signal becomes [L] level, and when the above binary digit information 0010110 is applied to the terminal Ti as the recording signal, the outputs E1, E2 from the Ex-OR gates 3, 4 become 0000000 and 1111111, respectively.

Namely, the signal applied to the amplifier AMP3 through the resistors R7, R8 becomes an intermediate value of amplitudes of the binary digit signals [1] and [0], i.e., the intermediate voltage.

It should be noted that the construction of the signal generating means is not limited to the one shown in FIG. 9. Anyone that generates the intermediate value of amplitudes of the binary signal, can be employed.

Next, there is shown in FIG. 10 a well-known push-pull type recording amplifier used in the magnetic recording of a digital information signal.

The push-pull type recording amplifier 24 comprises an amplifier AMP4 for amplifying a recording signal to a certain level, a first transistor Tr1 of which circuit is constructed to turn on by the recording signal amplified by the amplifier AMP4, a second transistor Tr2 of which circuit is turned on by the inverted recording signal amplified by the amplifier AMP4, a constant current circuit Ia for causing a sum of currents through the first and second transistors Tr1, Tr2 to be constant, and a pulse transformer L for inducing a current which is applied to the rotary transformers Ra, Rb responsive to ON/OFF of the transistors Tr1, Tr2.

This push-pull type recording amplifier 24 has features that it is possible to cause a constant alternate current to always flow and a construction of the circuit to be simple.

Upon performing the intermittent recording mentioned in the foregoing, the push-pull type recording amplifier 24 is always supplied with the recording signal. Thus, either of the first and second transistors Tr1, Tr2 becomes ON, resulting that the current is applied to the rotary transformers Ra, Rb. Thus, in the intermittent recording, when the signal is not supplied, the discharge signal Sd is generated in the rotary heads a1, b1 in the same manner as mentioned in Description of the Related Art.

As shown in FIG. 11, in the present invention, in order to prevent the discharge signal Sd form generating, the constant current circuit Ia in FIG. 10 is constructed of control means (a switch circuit) 25.

The switch circuit 25 comprises a transistor Tr3 and a direct current potential source V2 and a switch SW3. When the information signal is written, the switch SW3 is turned off, responsive to the control pulse signal generated by the control pulse generating device as mentioned in the foregoing, resulting in that the transistor Tr3 is operative. Thus, current i1 from emitters of the transistors Tr1, Tr2 flows, and the recording signal is applied to the rotary transformers Ra, Rb.

When the information signal is inhibited to be recorded, the switch SW3 is turned on responsive to the control pulse signal generated by the control pulse generating device as mentioned in the foregoing. Thus, the base of the transistor Tr3 is short-circuited to the ground, and the recording signal is not applied to the rotary transformers Ra, Rb because the current i1 from the transistors Tr1, Tr2 does not flow.

Thereby, upon writing, it is possible to perform the recording operation. When the writing operation is inhibited, the current supplied to the transistors Tr1, Tr2 can be made to be zero irrespective of the level of the signal supplied to the amplifier 24. This causes the intermediate signal with respect to the amplitude of the recording signal to be supplied to the plural rotary heads a1, b1, resulting in a simple circuit construction capable of preventing discharge signal Sd from generating.

As mentioned in the foregoing, each of the above switches SW1, SW2 or the switch circuit 25 is provided to a previous stage of the rotary transformers Ra, Rb for supplying the recording signal to the rotary heads a1, b1 or to that of the pulse transformer L. Thus, it is possible to securely prevent the discharge signal Sd without providing the switch to each of a plurality of rotary heads a1, b1.

According to the present invention, it is possible to obtain a signal of an intermediate voltage even when the signal value corresponding to an intermediate value of the amplitude of the recording signal is not included in the incoming recording signal responsive to the signal value of the digital information signal.

Thus, when the intermittent recording is performed by running the magnetic tape T more slowly than the normal recording, it is possible to prevent the discharge signal Sd caused by the writing inhibition of the recording signal from generating, resulting in a prevention of a degradation of S/N of the information signal caused by the overwriting of the discharge signal Sd on the intermittently recorded tracks.

What is claimed is:

1. Information signal recording apparatus for recording a recording signal on a magnetic tape, the apparatus comprising a rotary drum, plural rotary heads provided on the rotary drum, each of the plural rotary heads having a rotary transformer for recording the recording signal which is produced by processing a digital information signal to be recorded with a predetermined treatment, on the magnetic tape to form a predetermined track pattern by supplying the recording signal to the plural rotary heads through the rotary transformers, the apparatus further comprising:

signal generating means for generating a signal having an intermediate voltage of an amplitude of the recording signal to be supplied to the rotary heads, wherein when an intermittent recording is performed with the plural rotary heads by running the magnetic tape more slowly than a normal recording to form such a normal track pattern as formed in the normal recording, and during inoperative intervals the signal having the intermediate voltage of the amplitude of the recording signal is applied to the plural rotary heads to prevent the track pattern already recorded from being rewritten by the rotary heads.

2. Information signal recording apparatus as claimed in claim 1 further comprising control signal generating means for producing a control pulse signal of H level and L level responsive to a rotation of the rotary drum.

3. Information signal recording apparatus as claimed in claim 2 further comprising switching means for selectively switching the recording signal to the signal having the intermediate voltage responsive to the control pulse signals generated from the control signal generating means.

4. Information signal recording apparatus for recording a recording signal on a magnetic tape, the apparatus comprising a rotary drum, plural rotary heads provided on the rotary drum, each of the plural rotary heads having a rotary transformer for recording the recording signal which is produced by processing a digital information signal to be recorded with a predetermined treatment, on the magnetic tape to form a predetermined track pattern by supplying the recording signal to the plural rotary heads through the rotary transformers, the apparatus further comprising:

a push-pull type recording amplifier having transistors for supplying the recording signal to the plural rotary heads by switching operation of transistors; and control means for controlling currents flowing through the transistors, wherein when an intermittent recording is performed with the plurality of the rotary heads by running the magnetic tape more slowly than a normal recording to form such a normal track pattern as formed in the normal recording, and during inoperative intervals the plural rotary heads are not supplied with the recording signal by the control means.

5. Information signal recording apparatus as claimed in claim 4 further comprising control signal generating means for producing a control pulse signal of H level and L level responsive to a rotation of the rotary drum, wherein the plural rotary heads are cut-off to be supplied with the recording signal by the control means responsive to the pulse control signal generated from the control signal generating means.

* * * * *